United States Patent [19]

Brauer

[11] 3,874,322

[45] Apr. 1, 1975

[54] VEHICLE POSITION INDICATOR

[76] Inventor: William Alvin Brauer, 28W384 Gary's Mill Rd., Winfield, Ill. 60190

[22] Filed: Feb. 15, 1974

[21] Appl. No.: 442,927

Related U.S. Application Data

[62] Division of Ser. No. 293,416, Sept. 29, 1972, Pat. No. 3,817,203.

[52] U.S. Cl. .............................................. 116/28 R

[51] Int. Cl. .............................................. B60q 9/00

[58] Field of Search ............ 116/28 R, 122, 94, 100; 40/128; 340/61; 160/10, 201, 189, 160/193; 33/392

[56] References Cited

UNITED STATES PATENTS

| | | | |
|---|---|---|---|
| 2,854,942 | 10/1958 | Ross | 116/28 R |
| 3,439,728 | 4/1969 | Martini | 160/193 |
| 3,793,981 | 2/1974 | Sparks | 116/28 R |

*Primary Examiner*—Swisher S. Clement
*Assistant Examiner*—Denis E. Corr
*Attorney, Agent, or Firm*—Peter Visserman

[57] ABSTRACT

A movable vehicle parking position indicator is disclosed which moves in conjunction with a garage door used to close off the parking area. As the garage door is opened, a ball-like indicator is lowered into a position clearly visible from the driver position of a vehicle entering or properly parked in the garage. As the door is closed, the indicator is retracted.

5 Claims, 3 Drawing Figures

37 35 31 36 32 33 30 36 37 38 34

PATENTED APR 1 1975 3,874,322
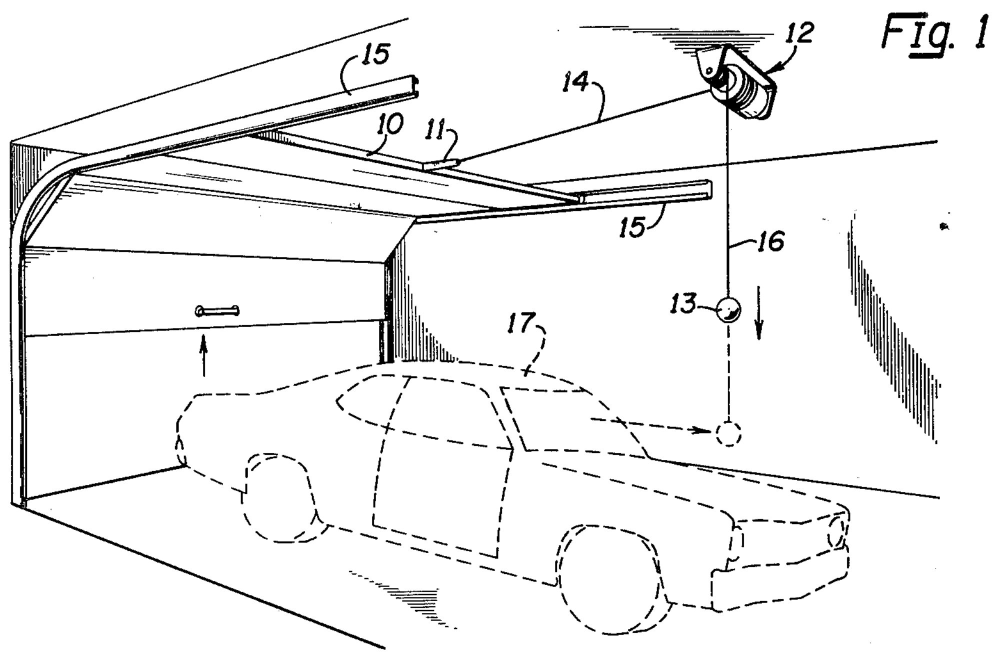
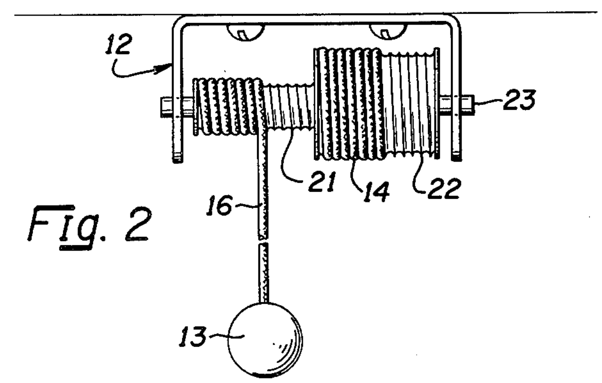
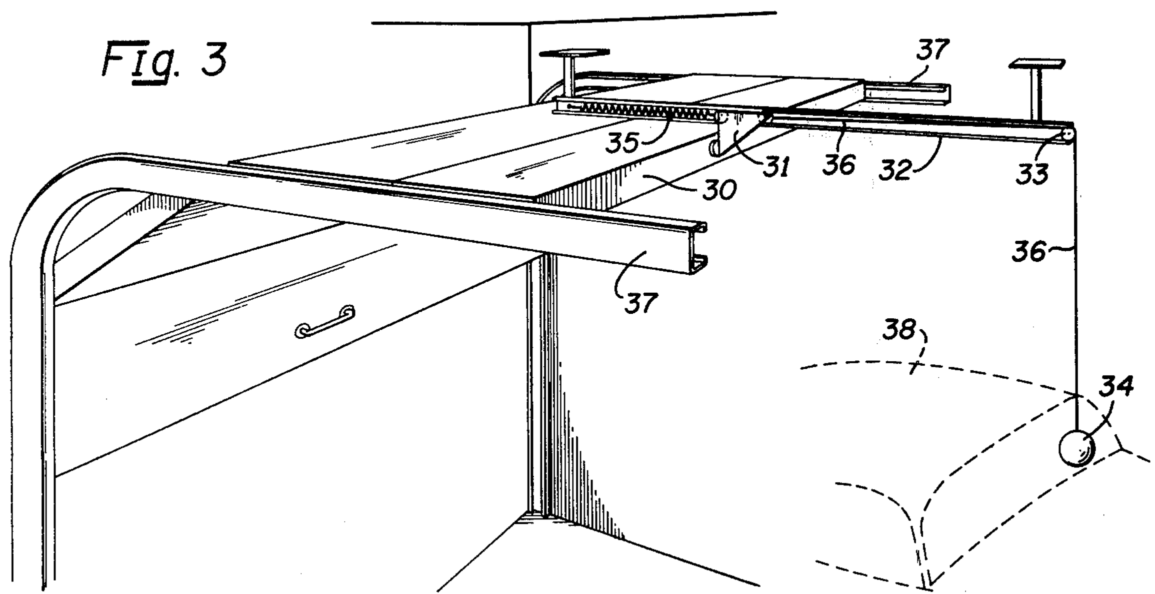

VEHICLE POSITION INDICATOR

This is a division of Application Ser. No. 293,416, filed September 29, 1972 now Pat. No. 3,817,203.

BACKGROUND OF THE INVENTION

1. Field of the Invention

This invention relates to indicating means used to indicate proper position of a vehicle in a garage, and more specifically relates to movable indicating means which moves in conjunction with a garage door.

2. Prior Art

Prior art arrangements are shown in which a ball-like warning device is suspended from a fixed point in a garage above the space to be occupied by a vehicle. In accordance with the prior art, proper positioning of a vehicle in the parking space is attained when the suspended device is aligned with, or touches, a certain portion of the vehicle. A disadvantage of the prior art arrangement is that the suspended device interferes with the use of the parking space when the space is not occupied by a vehicle.

SUMMARY OF THE INVENTION

In accordance with my invention, a movable indicator means is provided which moves in conjunction with a garage door or gate or the like, which is used to close off the parking area. A ball-like indicator device or the like is connected to a retraction device which is responsive to the opening movement of the door to position the indicator device within normal viewing range in front of the driver position of a vehicle entering or parked in the parking space. The retraction device is further responsive to the closing movement of the door to withdraw the indicator device to a position where it does not interfere with other uses of the parking space. Additionally, the movable indicator serves to indicate the position of the garage door to a driver positioned in a vehicle parked in the parking space. This latter feature is particularly important when the garage door is electrically operable by remote control by the driver. In such an instance the indicator device, which moves in conjunction with the door, will indicate to the driver when he can safely back the vehicle through the door opening.

In one illustrative embodiment of this invention an indicator device is suspended over a parking space by means of a flexible cord which is partially wound on a rotatable drum. Another flexible cord is fastened to the top portion of an overhead opening garage door and is also partially wound on the rotatable drum. As the door is opened, the weight of the indicator device causes the drum to rotate in such a direction as to lower the indicator device into the normal range of view in front of the driver position of a vehicle entering or marked in the garage. When subsequently the door is closed, the drum will be rotated in the opposite direction by reason of the cord fastened to the door, and the indicator device will be raised to a relatively higher position.

In a second illustrative embodiment of this invention, an indicator device is suspended over a parking space by means of a flexible cord, and is retracted by means of a springloaned sliding device. A guide rail is mounted in proximity of an overhead garage door and a slide is mounted in sliding contact with the guide rail. A coil spring is fastened to one end of the slide and one end of the rail, and the flexible cord is guided over a pulley and is fastened to the other end of the slide. As the overhead door is opened contact is made between the door and the slide, causing the slide to move in the direction of the pulley and causing the indicator device to be lowered. As the door is closed the slide is drawn back to its original position by the force of the coil spring, causing the indicator device to be raised.

BRIEF DESCRIPTION OF THE DRAWING

FIG. 1 is a perspective view of a retractable position indicator with a rotatable drum retraction device which operates in conjunction with an overhead garage door.

FIG. 2 is a front view of the rotatable drum retraction device.

FIG. 3 is a perspective view of a retractable position indicator with a slide retraction device which operates in conjunction with an overhead garage door.

DETAILED DESCRIPTION

FIG. 1 is a perspective view of an overhead door 10 commonly used in garages. As can be seen from the drawing, the door has rollers on each side which run in channel like guide rails 15 on either side of the door. The door is opened by lifting and the rollers on either side of the door cause the door to follow the general path of the guide rails. In this illustrative arrangement, a rotatable drum retraction device 12 is mounted above the space in which a vehicle may be parked in the garage, and in proximity of the garage door. A flexible cord 14 extends from the bracket 11, which is mounted on the garage door, to the retraction device 12. Another flexible cord 16 extends from the retraction device downward and is fastened to a ball-like indicator 13. FIG. 2 is a front view of the retraction device. As can be seen from the drawing, in this illustrative embodiment the retraction device 12 comprises two rotatable drums 21 and 32, having different diameters. The two drums are rigidly interconnected such that the forces applied to one of the drums is transmitted to the other. The drums are mounted on a common shaft 23. The flexible cord 14, which is connected to the door 10, is partially wound on the smaller drum 21. In order to attain a more even distribution of the cords on the drums as the drums are rotated, the drums may be grooved so as to guide the cords as shown in FIG. 2. When the door is in the fully closed position, the flexible cord 14 will be extended substantially entirely and the portion of flexible cord 16 extending below the drum 21 will be relatively short. As a result, the indicator ball 13 will be drawn up close to the drum 21. As the door is opened, the cord 14 will tend to become slack and the rotational force exerted on drum 21 by the weight of the indicator 30 ball 13 will cause both drum 21 and drum 22 to turn in a direction so as to lower the indicator and to wind up the cord 14. When the door is fully opened, the indicator ball 13 will be within the normal range of view in front of the driver position of a vehicle 17 entering or parked in the garage. Clearly, the desired lengths of cords 14 and 16 depend on the distance from the door 10 to the retraction device and the distance from the retraction device 12 to the vehicle expected to be parked in the garage. Similarly, the ratio of the diameters of the two drums is a function of the same distances. In one environment, where the distance of travel of the door is approximately twice as great as the distance of travel of the indicator, the diameter of the drum 22 may advantageously be chosen to be twice as great as the diameter of drum 21.

In a second illustrative embodiment of my invention, shown in FIG. 3, a slide retraction device is used with an overhead garage door. As shown, the retraction device comprises a door contact slide 31 having a pair of rollers attached thereto which can travel longitudinally along the guide rail 32. Such guide rail and roller combinations are well known. The retraction device is mounted in the proximity of the door and in such a position that the lower portion of the slide 31 extends into the path of travel of the door 30, which path is determined by the door guides 37. A means is provided, which in this embodiment comprises a coil spring 35, for returning the slide 31 to a position near the garage door 30, when the door is in the closed position. A flexible cord 36 is fastened to the slide 31 and to a ball-like indicator device 31. The flexible cord 36 is guided over a pulley 33 which may be mounted on the guide rail 32 as shown or at some point beyond the end thereof, depending on the desired position of the ball 34 relative to position of a vehicle 38 parked in the garage. As the garage door 30 is opened beyond a certain point, its upper edge will be pushed against the slide 31 tending to move the slide toward the end of the guide rail 32 which is farthest away from the door 30. As a result, the indicator ball 34 will be lowered to a position within the normal range of view in front of the driver position of a vehicle entering or parked in the garage. As the door 30 is closed, the force exerted by the coil spring 35 will tend to move the slide 31 in the direction of travel of the door, thereby causing the indicator ball 34 to be raised. As is apparent, the exact position of the ball 31 when the door is in the fully opened or fully closed position is determined by proper positioning of the guide rail 32 and adjusting the length of the cord 36.

In the foregoing two embodiments of my invention are described. It is understood that these embodiments are illustrative and that other similar arrangements may be developed by those skilled in the art without departing from the scope or spirit of my invention.

What is claimed is:

1. In combination with a garage structure having an entry at one end thereof, a garage door having a closed position for closing off said entry way and an open position allowing access to said garage structure, a parking area enclosed by said garage structure and having defined boundaries, said structure being extended over said parking area;

means for defining a path of travel of said door between said open and said closed position;

a guide rail positioned parallel to a portion of said defined path;

a slide mounted in sliding contact on said guide rail and intersecting the path of travel of said door, said slide being moved along said guide rail in the direction of travel of said door when said door travels toward its open position;

a spring mechanism connected to said slide urging said slide in the direction of travel of said door when said door travels toward its closed position;

indicator means;

flexible cord means connected to said slide and said indicator means; and a cord guide connected to said structure over said parking said flexible cord means being supported by said cord guide and said indicator means being suspended over said area by said flexible cord means, whereby travel of said slide in the direction of travel of said door is translated into travel of said indicator means in the vertical direction.

2. The combination in accordance with claim 1 wherein said slide has at least two rollers and said guide rail is adapted to provide a travel path for said rollers.

3. The combination in accordance with claim 1, wherein said cord guide comprises a pulley.

4. An arrangement for simultaneously indicating the proper position of a vehicle in a parking space having defined boundaries within a garage structure and the position of a garage door;

a doorway in said structure to allow access to said space, said garage door being slidably connected to said structure to close off said doorway in a closed position and allow vehicular access through said doorway in an open position;

a longitudinally extending guide rail;

support means connected to said structure for supporting said guide rail over said space;

means for defining a path of travel for said door between its open and its closed positions;

a slide mounted in sliding contact on said guide rail and intersecting the path of travel of said door, said slide being moved along said guide rail in the direction of travel of said door when said door is moved toward its open position;

a spring connected to said guide rail and to the slide urging the slide in the direction of travel of said door when said door is moved toward its closed position; indicator means;

a flexible cord connected to said slide and to said indicator means;

a cord guide mounted near one end of said guide rail, said flexible cord being supported by said cord guide, whereby said indicator means is suspended over said space and is raised to a relatively higher position by movement of said door from its open position toward its closed position and said indicator means is lowered to a relatively lower position when said door is moved to its open position.

5. The arrangement in accordance with claim 4, wherein said door is an overhead opening door slidably movable in a pair of tracks connected to said structure, having a vertical closed position and a horizontal open position wherein said door is disposed over said space.

* * * * *